(12) United States Patent
Okazaki et al.

(10) Patent No.: US 12,370,875 B2
(45) Date of Patent: Jul. 29, 2025

(54) ELECTRIC WORK VEHICLE

(71) Applicant: KUBOTA CORPORATION, Osaka (JP)

(72) Inventors: Kazuto Okazaki, Sakai (JP); Shinichi Kawabata, Sakai (JP); Keita Aoki, Sakai (JP); Ryunosuke Matsumoto, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/676,708

(22) Filed: May 29, 2024

(65) Prior Publication Data

US 2024/0308318 A1    Sep. 19, 2024

Related U.S. Application Data

(63) Continuation of application No. PCT/JP2022/041821, filed on Nov. 10, 2022.

(30) Foreign Application Priority Data

| Dec. 24, 2021 | (JP) | 2021-211643 |
| Dec. 24, 2021 | (JP) | 2021-211644 |
| Dec. 24, 2021 | (JP) | 2021-211645 |

(51) Int. Cl.
 *B60L 50/60* (2019.01)
 *A01D 34/64* (2006.01)
 (Continued)

(52) U.S. Cl.
 CPC ............... *B60K 1/00* (2013.01); *B60K 11/04* (2013.01); *B60K 17/28* (2013.01); *B60L 50/60* (2019.02);
 (Continued)

(58) Field of Classification Search
 CPC .......... B60K 1/00; B60K 11/04; B60K 17/28; B60K 2001/006; B60K 7/00; B60K 6/00;
 (Continued)

(56) References Cited

U.S. PATENT DOCUMENTS

| 2018/0066570 A1* | 3/2018 | Shiraga | A01D 34/81 |
| 2021/0057964 A1* | 2/2021 | Kiyomihara | H02K 11/05 |

(Continued)

FOREIGN PATENT DOCUMENTS

| EP | 2323469 A1 * | 5/2011 | B60L 11/1803 |
| JP | 2006197785 A * | 7/2006 | B60L 3/0061 |

(Continued)

OTHER PUBLICATIONS

Petrov, WO-2015113121-A1, Machine Translation of Specification (Year: 2015).*

(Continued)

*Primary Examiner* — Paul N Dickson
*Assistant Examiner* — Matthew Joseph Ganci
(74) *Attorney, Agent, or Firm* — Keating & Bennett, LLP

(57) ABSTRACT

An electric work vehicle includes a body, a travel device in the body, a motor to drive the travel device, an inverter to supply power to the motor, an electric component, a DC/DC converter to convert a voltage of power to be supplied to the electric component, a radiator to cool coolant, and a cooling path through which the coolant cooled by the radiator circulates through the motor, the inverter, and the DC/DC converter and returns to the radiator. The cooling path extends from the radiator, passes through the inverter, the motor, and the DC/DC converter in this order, and returns to the radiator.

16 Claims, 11 Drawing Sheets

(51) Int. Cl.
  *A01D 34/78* (2006.01)
  *B60K 1/00* (2006.01)
  *B60K 11/04* (2006.01)
  *B60K 17/28* (2006.01)

(52) U.S. Cl.
  CPC .............. *A01D 34/64* (2013.01); *A01D 34/78* (2013.01); *B60K 2001/006* (2013.01); *B60L 2200/40* (2013.01); *B60L 2210/10* (2013.01); *B60L 2210/44* (2013.01); *B60L 2240/36* (2013.01)

(58) Field of Classification Search
  CPC ..... B60K 17/12; B60L 50/60; B60L 2200/40; B60L 2210/10; B60L 2210/44; B60L 2240/36; B60L 5/00; A01D 34/64; A01D 34/78
  See application file for complete search history.

(56) References Cited

U.S. PATENT DOCUMENTS

| | | |
|---|---|---|
| 2022/0275601 A1 | 9/2022 | Kunizawa et al. |
| 2022/0289073 A1 | 9/2022 | Takaki |
| 2022/0377959 A1 | 12/2022 | Nakayama et al. |
| 2023/0010534 A1 | 1/2023 | Miyazaki |

FOREIGN PATENT DOCUMENTS

| | | | |
|---|---|---|---|
| JP | 2010-110066 A | 5/2010 | |
| JP | 2013-158161 A | 8/2013 | |
| JP | 2014096909 A | 5/2014 | |
| JP | 2016135049 A | 7/2016 | |
| JP | 2016-152637 A | 8/2016 | |
| JP | 2021-000956 A | 1/2021 | |
| JP | 2021-080709 A | 5/2021 | |
| JP | 2021-099086 A | 7/2021 | |
| JP | 2021-104768 A | 7/2021 | |
| JP | 2021-129334 A | 9/2021 | |
| JP | 2021-151060 A | 9/2021 | |
| WO | WO-2007034794 A1 * | 3/2007 | .............. B60K 1/00 |
| WO | 2013069322 A1 | 5/2013 | |
| WO | WO-2015113121 A1 * | 8/2015 | .............. B60L 50/51 |
| WO | WO-2017038596 A1 * | 3/2017 | .............. B60K 1/02 |

OTHER PUBLICATIONS

Arai, JP-2006197785-A, Machine Translation of Specification (Year: 2006).*
Aikawa, WO-2007034794-A1, Machine Translation of Specification (Year: 2007).*
Hirai, WO-2017038596-A1, Machine Translation of Specification (Year: 2017).*
Official Communication issued in International Patent Application No. PCT/JP2022/041821, mailed on Jan. 31, 2023.
Official Communication issued in corresponding Japanese Patent Application No. 2021-211645, mailed on May 19, 2025, 5 pages.

* cited by examiner

ELECTRIC WORK VEHICLE

CROSS REFERENCE TO RELATED APPLICATIONS

This application claims the benefit of priority to Japanese Patent Application Nos. 2021-211643, 2021-211644 and 2021-211645 filed on Dec. 24, 2021 and is a Continuation application of PCT Application No. PCT/JP2022/041821 filed on Nov. 10, 2022. The entire contents of each application are hereby incorporated herein by reference.

BACKGROUND OF THE INVENTION

1. Field of the Invention

The present invention relates to electric work vehicles each including a travel device driven by a motor.

2. Description of the Related Art

As described in JP 2021-80709A, an electric work vehicle (electric work machine) drives a travel device with use of a motor (electric motor). The electric work vehicle includes a battery, an inverter, etc., to drive the motor, and further includes a DC/DC converter for converting a voltage of power to be supplied to various auxiliary devices.

Also, the electric work vehicle includes a radiator and a cooling path to cool the motor, the inverter, the DC/DC converter, etc. The cooling path is a path through which coolant cooled by the radiator circulates through the motor, the inverter, the DC/DC converter, etc., and returns to the radiator.

In particular, the motor generates a large amount of heat while operating, and therefore is cooled by the coolant.

For example, as described in JP 2021-129334A, a cooling path (cooling water path) is provided on a surface of a motor (motor unit), and the motor is cooled through heat transfer between the motor and coolant (cooling water) flowing through the cooling path.

A three-phase current (three-phase alternating current) for driving the motor is generated by an inverter. The inverter includes a power transistor such as an IGBT that generates the three-phase alternating current having a predetermined frequency. The IGBT generates a large amount of heat while operating, and therefore is cooled by the coolant.

For example, as described in JP 2016-152637A, an IGBT (power transistor) is cooled by a layered cooing device through which coolant passes.

SUMMARY OF THE INVENTION

However, there is demand for more efficiently targets to be cooled such as a motor, an inverter, and a DC/DC converter to stabilize the performance of the targets.

Also, there is demand for more efficiently disposing the motor or more efficiently cooling the motor.

Also, an inverter includes a capacitor, a resistor, etc., in addition to an IGBT, and it is necessary to cool these components. Therefore, there is demand for more efficiently cooling the components of the inverter including the IGBT.

Example embodiments of the present invention efficiently cool targets to be cooled such as a motor and components of an inverter.

An electric work vehicle according to an example embodiment of the present invention includes a body, a travel device in the body, a motor to drive the travel device, an inverter to supply power to the motor, an electric component, a DC/DC converter to convert a voltage of power to be supplied to the electric component, a radiator to cool a coolant, and a cooling path through which the coolant cooled by the radiator circulates through the motor, the inverter, and the DC/DC converter and returns to the radiator, wherein the cooling path extends from the radiator, passes through the inverter, the motor, and the DC/DC converter in this order, and returns to the radiator.

Devices such as the inverter, the motor, and the DC/DC converter generate heat while operating. Also, these devices may malfunction due to the influence of the heat. Therefore, the devices are cooled while operating.

Here, the motor generates a large amount of heat while operating. The inverter generates less heat than the motor, but generally has lower heat resistance than the motor, and is significantly affected by heat. The DC/DC converter generates a small amount of heat and is less likely to malfunction due to heat compared with the motor and the inverter.

Accordingly, the coolant flowing through the cooling path of the electric work vehicle cools the inverter, the motor, and the DC/DC converter in this order.

Therefore, the inverter, which has low heat resistance and is to be preferentially cooled, can be cooled first.

Moreover, the motor generates a large amount of heat, and therefore, when the coolant cools the motor through heat transfer with the motor, the temperature of the coolant significantly increases and the cooling ability of the coolant decreases. Since the coolant cools the inverter before cooling the motor, it is possible to appropriately cool the inverter. Note that it is possible to appropriately cool the motor even with the coolant that has cooled the inverter because the inverter generates less heat than the motor and the motor generates a large amount of heat. Furthermore, the DC/DC converter generates a small amount of heat, and the need to cool the DC/DC converter is lower than the need to cool the inverter. Therefore, it is possible to sufficiently cool the DC/DC converter with the coolant that has cooled the motor.

For the reasons described above, the coolant flowing through the cooling path can efficiently and appropriately cool the inverter, the motor, and the DC/DC converter.

The radiator, the inverter, and the motor may be arranged in this order in a front-rear direction of the body from a front side corresponding to a forward travel direction of the body.

In this configuration, the radiator, the inverter, and the motor are arranged in this order in which these devices are cooled by the coolant, and therefore, the cooling path can be configured efficiently, and the inverter, the motor, and the DC/DC converter can be cooled efficiently.

The DC/DC converter may be beside the radiator on one side in a left-right direction orthogonal to the front-rear direction.

The cooling path extends from the DC/DC converter to the radiator. By arranging the DC/DC converter and the radiator side by side in the left-right direction as described above, it is possible to efficiently configure the cooling path extending from the DC/DC converter to the radiator.

A configuration is also possible in which the cooling path includes a portion extending from the inverter to the motor and connected to the motor on another side of the motor opposite to the one side in the left-right direction, and the cooling path includes another portion extending from the motor to the DC/DC converter and connected to the motor on the one side of the motor in the left-right direction.

In this configuration, the portion of the cooling path extending from the motor to the DC/DC converter is on the DC/DC converter side in the left-right direction. Also, the portion of the cooling path extending from the inverter to the motor and the portion of the cooling path extending from the motor to the DC/DC converter are separately provided on opposite sides of the motor in the left-right direction.

Therefore, the portion of the cooling path extending from the inverter to the motor and the portion of the cooling path extending from the motor to the DC/DC converter are efficiently configured.

A configuration is also possible in which the electric work vehicle further includes a battery to store power to be supplied to the motor via the inverter, and the inverter is under the battery and overlaps the battery in a plan view.

With this configuration, the inverter and the battery are arranged efficiently.

An electric work vehicle according to another example embodiment of the present invention includes a body, a travel device in the body, a motor to drive the travel device, a radiator to cool a coolant, and a cooling path through which the coolant cooled by the radiator passes at least through the motor and returns to the radiator, wherein the motor includes a motor coolant path through which the coolant circulates in a surface region of the motor, an inlet portion connected to the motor coolant path and through which the coolant flowing through the cooling path enters the motor coolant path, and an outlet portion connected to the motor coolant path and through which the coolant that flowed through the motor coolant path is discharged to the cooling path, wherein in a front view, the inlet portion and the outlet portion are above a horizontal center line passing through a center of the motor in an up-down direction, and are separately provided on opposite sides of a vertical center line passing through a center of the motor in a width direction.

With this configuration, the motor includes a main structure (body) that has a circular cross section and a rotation axis at its center, and the inlet portion and the outlet portion can be arranged separately at left and right corners of an arrangement region of the motor in a front view in which the region is small in the up-down direction (height direction) and the left-right direction (width direction). Accordingly, the region occupied by the motor as a whole including the inlet portion and the outlet portion can be reduced in the height direction and the width direction of the body, and the arrangement efficiency of the motor can be increased.

A configuration is also possible in which, in the front view, the horizontal center line defines a first interior angle with a line segment connecting a rotation axis of the motor and the inlet portion, the horizontal center line defines a second interior angle with a line segment connecting the rotation axis and the outlet portion, and the first interior angle and the second interior angle are each about 30° or more and about 55° or less.

With this configuration, it is possible to reduce or minimize the influence of the inlet portion and the outlet portion on the width or the height of the motor as a whole and reduce the region of the body occupied by the motor as a whole including the inlet portion and the outlet portion to increase the arrangement efficiency of the motor.

A configuration is also possible in which the inlet portion and the outlet portion are located within a region between the horizontal center line and a straight line that is in contact with an upper end portion of the motor, and between a first vertical line and a second vertical line, the first vertical line being in contact with one end portion of the motor in the width direction, and the second vertical line being in contact with another end portion of the motor in the width direction.

With this configuration, it is possible to keep the inlet portion and the outlet portion from protruding from the main structure of the motor in the width direction and the height direction and reduce the region of the body occupied by the motor as a whole including the inlet portion and the outlet portion to increase the arrangement efficiency of the motor.

A configuration is also possible in which the motor coolant path spirally extends along a circumferential wall of the motor, and the coolant that enters from the inlet portion flows in the width direction toward the outlet portion and, after flowing around the circumferential wall once, flows toward the outlet portion.

In this configuration, the motor coolant path has a length that is equal or substantially equal to a sum of a length of the circumferential wall of the motor and a distance between the inlet portion and the outlet portion along the circumferential wall. Accordingly, it is possible to efficiently increase the length of the motor coolant path and increase a cooling efficiency of the motor.

A configuration is also possible in which the motor further includes a three-phase power supply terminal to receive input of a three-phase current, and a signal terminal, the three-phase power supply terminal is below the horizontal center line in the front view, the signal terminal is in a vicinity of the horizontal center line in the front view, and the three-phase power supply terminal and the signal terminal have respective centers deviated from each other in the width direction.

With this configuration, it is possible to efficiently increase a distance from the inlet portion and the outlet portion to the three-phase power supply terminal and the signal terminal. Therefore, even if the coolant leaks from the inlet portion or the outlet portion, the three-phase power supply terminal and the signal terminal can be kept from being affected by the coolant.

Also, it is possible to efficiently increase a distance between the three-phase power supply terminal and the signal terminal. Therefore, it is possible to keep the three-phase power supply terminal and the signal terminal from being affected by signal noise from each other, and increase the reliability of currents (signals) flowing through the three-phase power supply terminal and the signal terminal.

The electric work vehicle may further include a body frame including a bottom plate, a vertical plate, and a pair of side plates, and the motor may be supported by the vertical plate in a cantilever manner and located above the bottom plate and between the pair of side plates.

With this configuration, it is possible to efficiently arrange the motor.

The electric work vehicle may further include a hydraulic pump to supply hydraulic fluid, and the hydraulic pump may be laterally outward of the motor and held by the vertical plate.

With this configuration, it is possible to efficiently arrange the motor and the hydraulic pump.

An electric work vehicle according to another example embodiment of the present invention includes a body, a travel device in the body, a motor to drive the travel device, an inverter to supply power to the motor, a radiator to cool a coolant, and a cooling path through which the coolant cooled by the radiator passes at least through the inverter and returns to the radiator, wherein the inverter includes an inverter case including a mounting plate and defining a closed space, a capacitor on the mounting plate in the closed space to smooth a direct current input to the capacitor, a power transistor on the mounting plate in the closed space to convert the direct current supplied from the capacitor to a three-phase alternating current having a predetermined frequency, a resistor on the mounting plate in the closed space to discharge power stored in the inverter, and an inverter coolant path provided inside the mounting plate and through which the coolant circulates through the inverter to cool the capacitor, the power transistor, and the resistor, wherein the power transistor includes a heat sink, the inverter coolant path includes a through hole penetrating toward the closed space, and the heat sink extends through the through hole and protrudes into the inverter coolant path.

With this configuration, the capacitor, the power transistor, and the resistor included in the inverter are efficiently cooled through heat transfer between the coolant and these components via the mounting plate of the inverter case.

Moreover, the heat sink of the power transistor extends through the through hole of the mounting plate and protrudes into the inverter coolant path. With this configuration, the heat sink directly comes into contact with the coolant, and therefore, it is possible to efficiently cause heat dissipation from the power transistor, which generates a large amount of heat, to cool the power transistor.

It is preferable that the inverter includes an O-ring in a gap between an outer peripheral portion of the power transistor and an inner peripheral portion of the through hole.

This configuration improves the hermeticity between the power transistor and the inverter case and reduces or prevents leakage of the coolant to the inside of the inverter case via the through hole.

It is preferable that the inverter coolant path includes a protruding portion in which the mounting plate protrudes toward the power transistor in a region of the inverter coolant path that overlaps the power transistor.

In this configuration, the inverter coolant path becomes narrower toward the power transistor in the region where the heat sink protrudes and the power transistor is cooled. Consequently, the coolant flows while precisely coming into contact with the heat sink, and the flow rate of the coolant increases, and therefore, the power transistor can be cooled efficiently.

The inverter coolant path may include a coolant storing section in a region where the coolant enters, and the coolant storing section may have a larger cross-sectional area than a remaining portion of the inverter coolant path other than the coolant storing section.

In this configuration, the coolant that enters the inverter coolant path is temporarily stored in the coolant storing section, and a sufficient amount of coolant flows to the inverter coolant path. Consequently, the inverter coolant path is precisely filled with the coolant, and components such as the capacitor, the power transistor, and the resistor can be efficiently cooled by the coolant.

The coolant may cool the capacitor, the power transistor, and the resistor in this order.

The capacitor generally has lower heat resistance than the power transistor. The power transistor generates more heat than the capacitor while operating. The possibility of malfunction of the resistor due to heat is lower than the possibilities of malfunction of the capacitor and the power transistor due to heat, and accordingly, the need to cool the resistor is lower than the need to cool the capacitor and the power transistor. The coolant cools the targets to be cooled through heat transfer with the targets. Furthermore, the power transistor generates a large amount of heat, and therefore, the cooling ability of the coolant decreases when the coolant cools the power transistor. For the reasons described above, it is preferable to preferentially cool the capacitor. Also, it is preferable to cool the capacitor with the coolant before cooling the power transistor.

Therefore, it is possible to efficiently cool the capacitor, the power transistor, and the resistor in a well-balanced manner by structuring the inverter coolant path in such a manner that the coolant cools the capacitor, the power transistor, and the resistor in this order.

The electric work vehicle may further include a temperature sensor to measure a temperature of the coolant between a position at which the coolant cools the capacitor and a position at which the coolant cools the power transistor in the inverter coolant path.

As described above, it is preferable to preferentially cool the capacitor. Also, the power transistor generates a large amount of heat, and accordingly, it is important to control the temperature of the coolant flowing through the power transistor in order to sufficiently cool the power transistor.

When the temperature of the coolant that has cooled the capacitor is too high, it can be determined that the capacitor may have not been sufficiently cooled, and when the temperature of the coolant is sufficiently low, it can be determined that the capacitor is sufficiently cooled. Also, when the temperature of the coolant that has cooled the capacitor is too high, it can be determined that the capacitor is not sufficiently cooled, or it can be determined that there is a risk that the power transistor will not be sufficiently cooled.

If the temperature of the coolant flowing between the capacitor and the power transistor in the inverter coolant path is measured as described above, it is possible to check cooling efficiencies of the capacitor and the power transistor to efficiently cool the capacitor and the power transistor.

For example, when the measured temperature of the coolant is about the room temperature, it can be determined that the amount of heat generated by the capacitor is small or the capacitor is sufficiently cooled, and accordingly, it is possible to precisely cool the power transistor. Therefore, it is possible to perform control to reduce the flow rate of the coolant or stop the flow of the coolant. Also, when the measured temperature of the coolant is higher than or equal to a predetermined temperature, it is possible to perform control to increase the flow rate of the coolant and perform control to stop operation of the inverter as necessary, for example.

The above and other elements, features, steps, characteristics and advantages of the present invention will become more apparent from the following detailed description of the example embodiments with reference to the attached drawings.

BRIEF DESCRIPTION OF THE DRAWINGS

FIG. 3 is a left side view showing an example arrangement of an inverter and the like.

DETAILED DESCRIPTION OF THE EXAMPLE EMBODIMENTS

Figure 1:
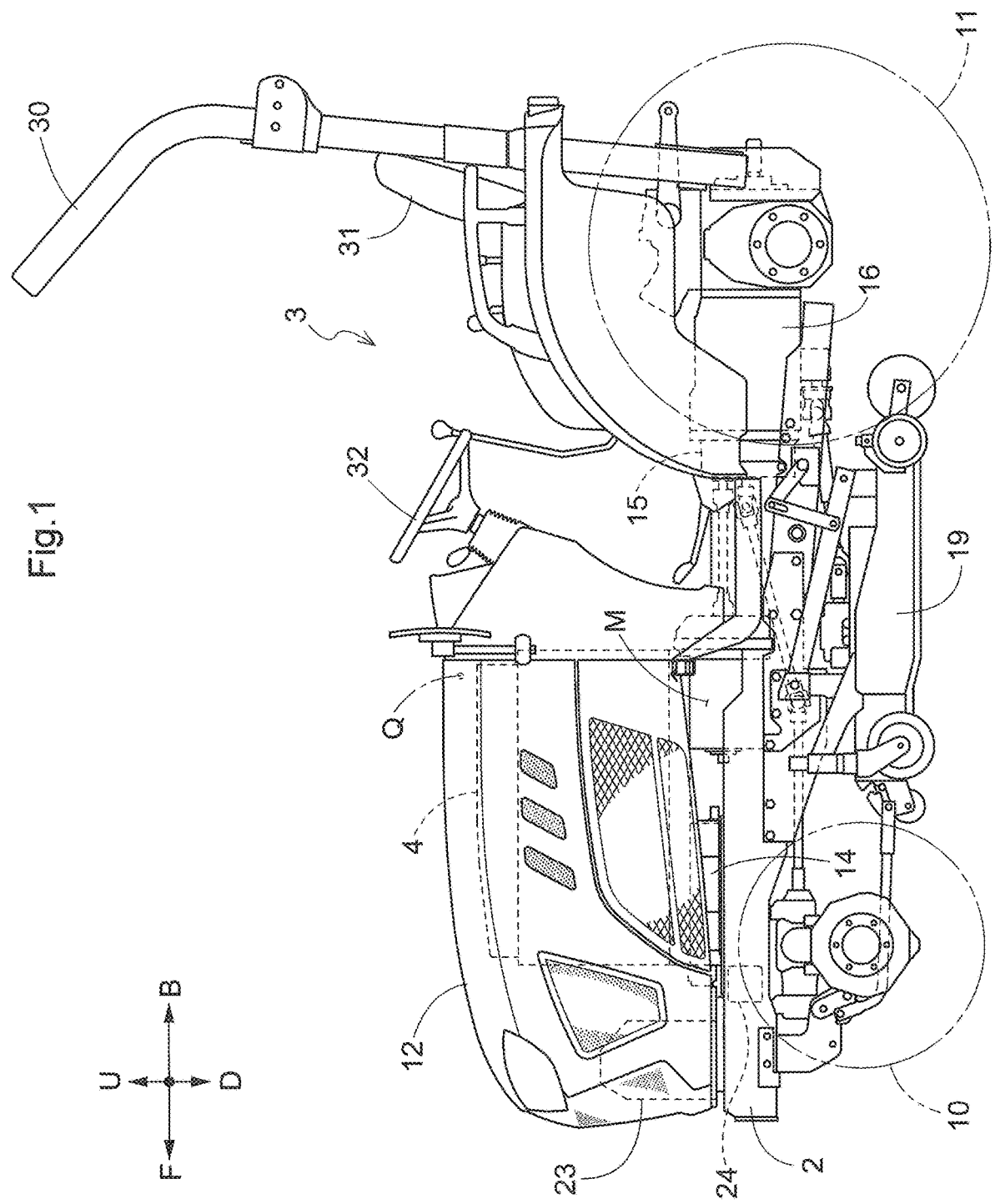
FIG. 1 is a left side view of a tractor.

Example embodiments of the present invention will be described based on the drawings. In the following description, the directions of arrows F, B, U, D, L, and R in the drawings will be respectively referred to as "the front side", "the rear side", "the upper side", "the lower side", "the left side", and "the right side" unless otherwise stated.

Figure 2:
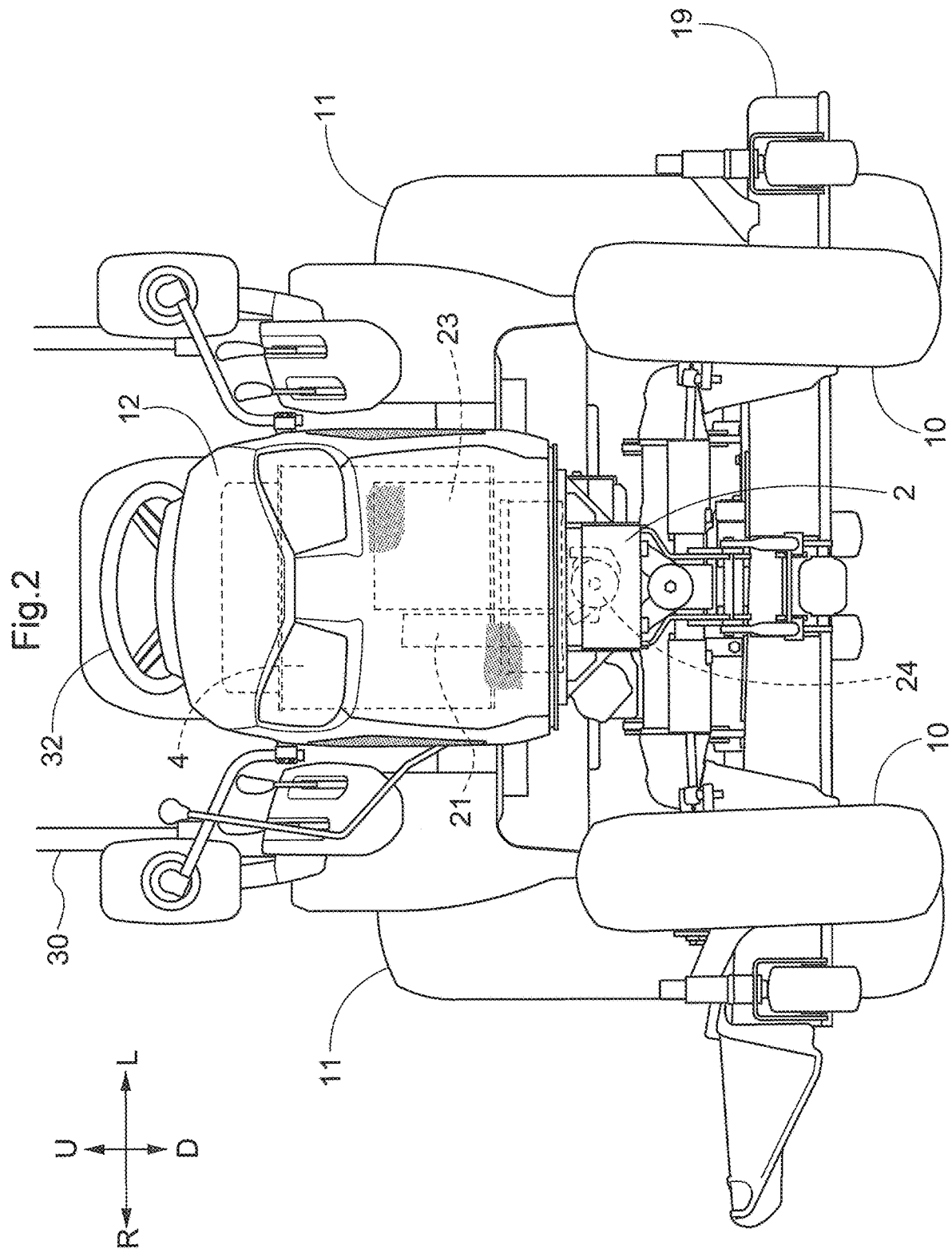
FIG. 2 is a front view of the tractor.

The following describes an electric tractor (hereinafter simply referred to as a "tractor") as an example of an electric work vehicle. As shown in FIGS. 1 and 2, the tractor includes left and right front wheels 10, left and right rear wheels 11, and a cover 12.

The tractor also includes a body frame 2 and a driving section 3. The body frame 2 is supported by the left and right front wheels 10 and the left and right rear wheels 11.

The cover 12 is disposed in a front portion of the body of the tractor. The driving section 3 is behind the cover 12. In other words, the cover 12 is in front of the driving section 3.

The driving section 3 includes a protective frame 30, a driver's seat 31, and a steering wheel 32. An driver can sit on the driver's seat 31. Accordingly, the driver can occupy the driving section 3. The driver steers the left and right front wheels 10 by operating the steering wheel 32. The driver can perform various driving operations in the driving section 3.

The tractor includes a battery 4. The cover 12 is pivotable about an opening/closing axis Q extending in the left-right direction of the body. Accordingly, the cover 12 is openable and closable. When the cover 12 is closed, the battery 4 is covered by the cover 12.

Figure 3:
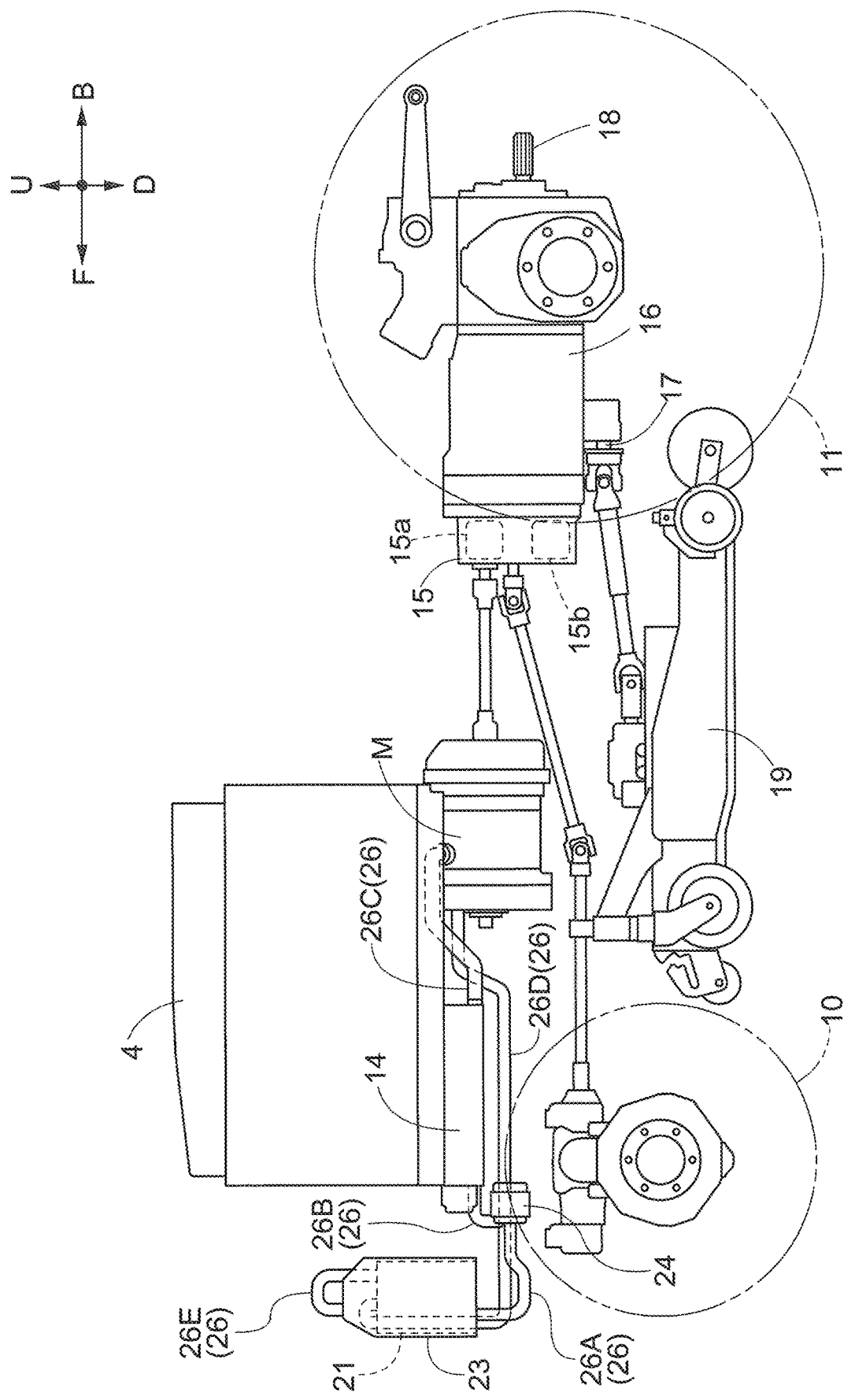

As shown in FIGS. 2 and 3, the tractor includes an inverter 14 and a motor M. The battery 4 supplies power to the inverter 14. The inverter 14 converts DC power supplied from the battery 4 to AC power (a three-phase alternating current), and supplies the AC power to the motor M. The motor M is driven by the AC power supplied from the inverter 14.

Figure 4:
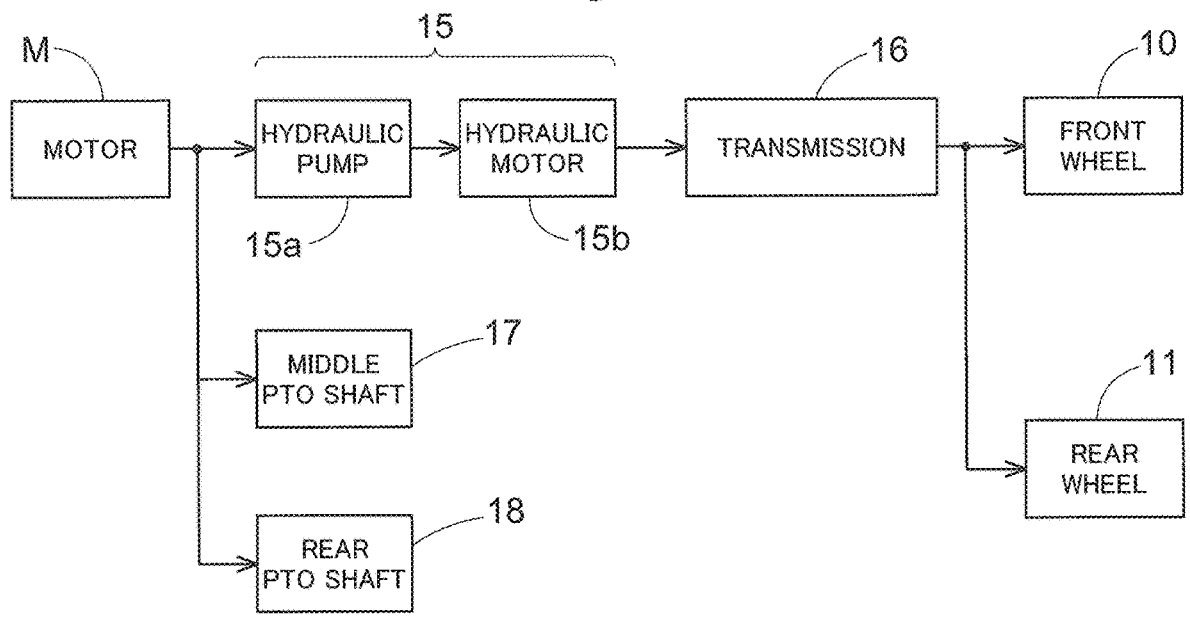
FIG. 4 is a diagram showing a flow of motive power transmission.

As shown in FIGS. 3 and 4, the tractor includes a hydraulic continuously variable transmission 15 and a transmission 16. As shown in FIG. 4, the hydraulic continuously variable transmission 15 includes a hydraulic pump 15a and a hydraulic motor 15b.

The hydraulic pump 15a is driven by rotational motive power transmitted from the motor M. As a result of the hydraulic pump 15a being driven, rotational motive power is output from the hydraulic motor 15b. The hydraulic continuously variable transmission 15 changes the speed of rotational motive power between the hydraulic pump 15a and the hydraulic motor 15b. Also, the hydraulic continuously variable transmission 15 is capable of changing the transmission ratio in a stepless manner.

The rotational motive power output from the hydraulic motor 15b is transmitted to the transmission 16. The speed of the rotational motive power transmitted to the transmission 16 is changed by a gear transmission mechanism included in the transmission 16, and the rotational motive power is distributed to the left and right front wheels 10 and the left and right rear wheels 11. Thus, the left and right front wheels 10 and the left and right rear wheels 11 are driven.

As shown in FIGS. 3 and 4, the tractor also includes a middle PTO shaft 17 and a rear PTO shaft 18. Rotational motive power output from the motor M is distributed to the hydraulic pump 15a, the middle PTO shaft 17, and the rear PTO shaft 18. The middle PTO shaft 17 and the rear PTO shaft 18 are rotated by the distributed rotational motive power.

If a work device is connected to the middle PTO shaft 17 or the rear PTO shaft 18, the work device is driven by rotational motive power transmitted by the middle PTO shaft 17 or the rear PTO shaft 18. For example, in the present example embodiment, a grass cutting device 19 is connected to the middle PTO shaft 17 as shown in FIG. 3. The grass cutting device 19 is driven by rotational motive power transmitted by the middle PTO shaft 17.

As described above, the inverter 14 converts the current supplied from the battery 4 to a three-phase alternating current (three-phase current) having a predetermined frequency, and supplies the three-phase alternating current to the motor M. The motor M is driven in accordance with the frequency of the supplied three-phase alternating current.

The inverter 14 and the motor M generate heat while operating. Therefore, the inverter 14 and the motor M are cooled while operating to reduce or prevent malfunction due to the heat. The following describes a cooling mechanism of the tractor with reference to FIGS. 3 and 5.

Here, in addition to the inverter 14 and the motor M, the tractor includes a DC/DC converter 21 that generates heat while operating. The DC/DC converter 21 supplies power to various auxiliary devices included in the tractor. The DC/DC converter 21 reduces (converts) the voltage of power supplied from the battery 4 to voltages corresponding to the auxiliary devices and supplies the power to the auxiliary devices.

The cooling mechanism to cool the inverter 14, the motor M, and the DC/DC converter 21, which are targets to be cooled, includes a radiator 23, an electric pump 24, and a cooling path 26.

The radiator 23 cools coolant that cools the inverter 14, the motor M, and the DC/DC converter 21. The radiator 23 cools the coolant with air passing through the radiator 23 from the front side of the body. The coolant cools the heated targets to be cooled through heat transfer between the coolant and the targets.

The cooling path 26 is a path through which the coolant flows from the radiator 23 through the targets to be cooled and returns to the radiator 23. The cooling path 26 includes a hollow pipe having a suitable cross-sectional shape, and the coolant flows through the internal space of the cooling path 26.

The electric pump 24 suctions the cooled coolant from the radiator 23 and causes the coolant to flow through the cooling path 26. Note that the coolant may be cooling water, an antifreeze solution, cooling gas, or the like, and is only required to be capable of flowing through the cooling path 26 and appropriately exchanging heat with the targets to be cooled.

Specifically, the radiator 23 is slightly eccentric leftward in a center region in the left-right direction of the body in the front portion of the body. The DC/DC converter 21 is beside the radiator 23 in the left-right direction on the right side of the radiator 23. The radiator 23 and the DC/DC converter 21 are disposed in the front portion of the body, and this facilitates the passage of air from the front side of the body.

The electric pump 24 is disposed below and behind the radiator 23 near the center region of the body in the left-right direction.

The inverter 14 is disposed behind the radiator 23 near the center region of the body in the left-right direction. Also, the inverter 14 is under the battery 4 and overlaps the battery 4 in a plan view. For example, the inverter 14 is located within a region where the battery 4 is disposed, in the plan view.

The motor M is disposed behind the inverter 14 near the center region of the body in the left-right direction. Also, the motor M is under the battery 4 and overlaps the battery 4 in a plan view. For example, the motor M is within the region where the battery 4 is disposed, in the plan view.

The electric pump 24 suctions the coolant cooled by the radiator 23 from the radiator 23 via a cooling path 26A included in the cooling path 26. The electric pump 24 causes the suctioned coolant to flow through the cooling path 26, circulate through the inverter 14, the motor M, and the DC/DC converter 21 in this order, and then return to the radiator 23.

The coolant pumped out from the electric pump 24 passes through a cooling path 26B included in the cooling path 26 and flows through the inverter 14. For example, the cooling path 26B extends upward on the right side of the electric pump 24 and is connected to a rightward portion of the front portion of the inverter 14.

The coolant that has passed through the inverter 14 flows out from a leftward portion of the rear portion of the inverter 14 to a cooling path 26C included in the cooling path 26. The coolant that has flowed out from the inverter 14 passes through the cooling path 26C and flows through the motor M. The cooling path 26C is connected to an inlet portion 28 provided in an upper left portion of the motor M, for example.

The coolant that has passed through the motor M flows out from an outlet portion 29 provided in an upper right portion of the motor M to a cooling path 26D included in the cooling path 26. The coolant that has flowed out from the motor M passes through the cooling path 26D and flows through the DC/DC converter 21. For example, the cooling path 26D extends below the inverter 14 on the right side of the inverter 14 and is connected to the DC/DC converter 21.

The coolant that has passed through the DC/DC converter 21 flows to a cooling path 26E included in the cooling path 26 between the DC/DC converter 21 and the radiator 23. Thus, the coolant is caused to flow through the cooling path 26 from the radiator 23 by the electric pump 24 to circulate through the inverter 14, the motor M, and the DC/DC converter 21 in this order and then return to the radiator 23.

As described above, the cooling path 26 is efficiently configured in accordance with the positions of the radiator 23, the electric pump 24, the inverter 14, the motor M, and the DC/DC converter 21.

Here, the inverter 14 generates the three-phase alternating current to control the motor M, and therefore, the heat resistance of the inverter 14 is generally lower than the heat resistance of the motor M, and the temperature of the inverter 14 is likely to be higher than the temperature of the DC/DC converter 21. Therefore, the inverter 14 needs to be sufficiently cooled to reduce or prevent malfunction due to the influence of heat and is preferably cooled with preference over the motor M and the DC/DC converter 21.

The motor M generally has higher heat resistance than the inverter 14 but generates more heat than the inverter 14.

The DC/DC converter 21 generates less heat than the inverter 14 and the motor M, and the need to cool the DC/DC converter 21 is lower than the need to cool the inverter 14 and the motor M. Moreover, the DC/DC converter 21 is disposed at a position where the passage of air is facilitated, and therefore, it can be expected that the DC/DC converter 21 is cooled by air.

As described above, the coolant flows through the cooling path 26 from the radiator 23 to the inverter 14, the motor M, and the DC/DC converter 21 in this order, and then returns to the radiator 23.

Accordingly, the coolant flows through the inverter 14 before flowing through the motor M, which generates a large amount of heat. The coolant cools the targets to be cooled through heat transfer between the coolant and the targets. Therefore, an increase in the temperature of the coolant that has passed through the motor M, which generates a large amount of heat, is larger than an increase in the temperature of the coolant that has passed through the inverter 14, and the cooling ability of the coolant that has passed through the motor M significantly decreases. The coolant flows through the inverter 14, which needs to be cooled preferentially, immediately after being cooled by the radiator 23 and before flowing through the motor M, and therefore, the coolant can effectively cool the inverter 14 by flowing through the inverter 14 while maintaining sufficiently high cooling ability.

Note that the inverter 14 generates less heat than the motor M, and therefore, even after the coolant passes through the inverter 14, the coolant has sufficiently high cooling ability and can sufficiently cool the motor M.

Also, the DC/DC converter 21 generates less heat than the inverter 14 and the motor M, and the cooling ability required for the coolant to cool the DC/DC converter 21 is low, and therefore, even the coolant that has passed through the motor M can cool the DC/DC converter 21 to the extent necessary and sufficient.

With the above-described configuration, the cooling mechanism according to the present example embodiment can efficiently cool the inverter 14, the motor M, and the DC/DC converter 21 with use of the coolant flowing through the cooling path 26.

Figure 5:
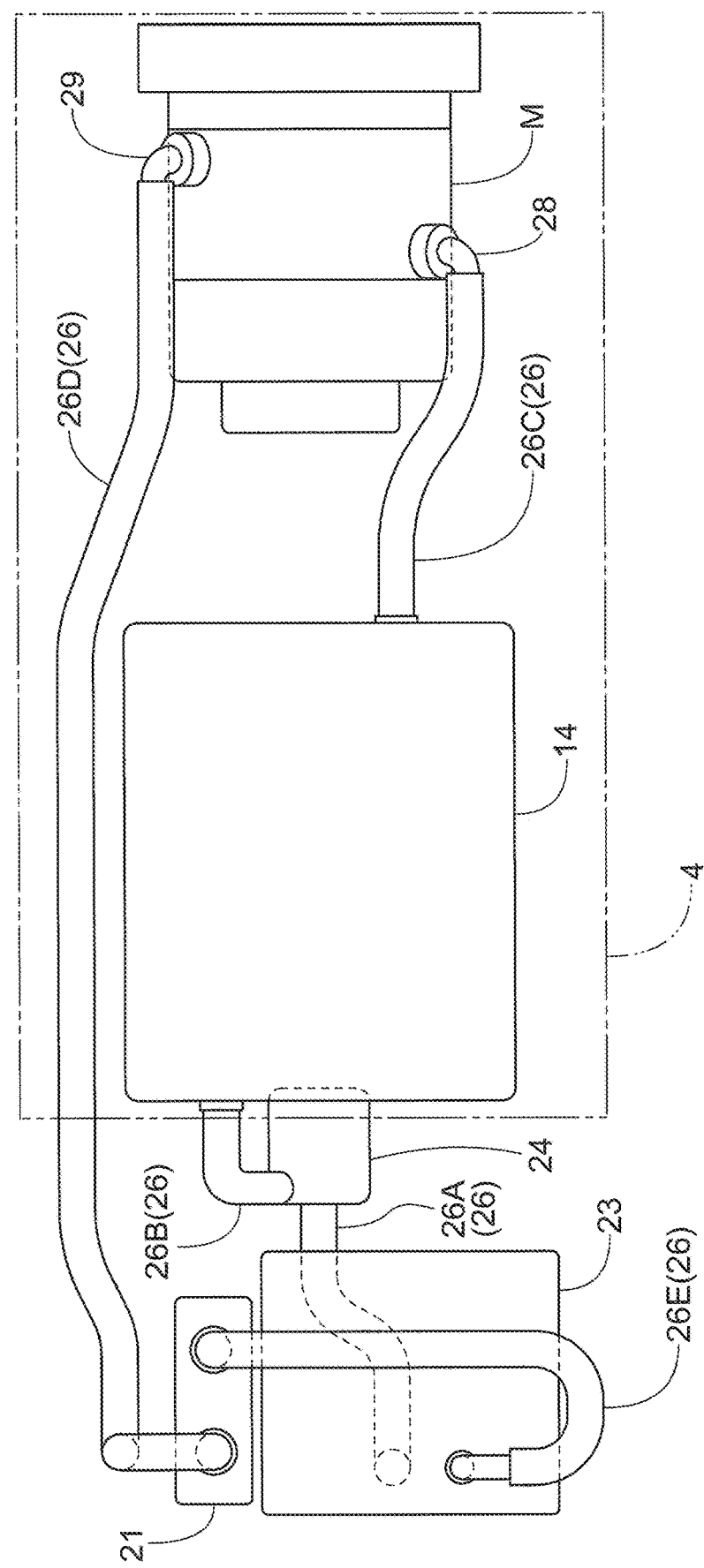
FIG. 5 is a plan view showing an example schematic configuration of a cooling path.
Figure 6:
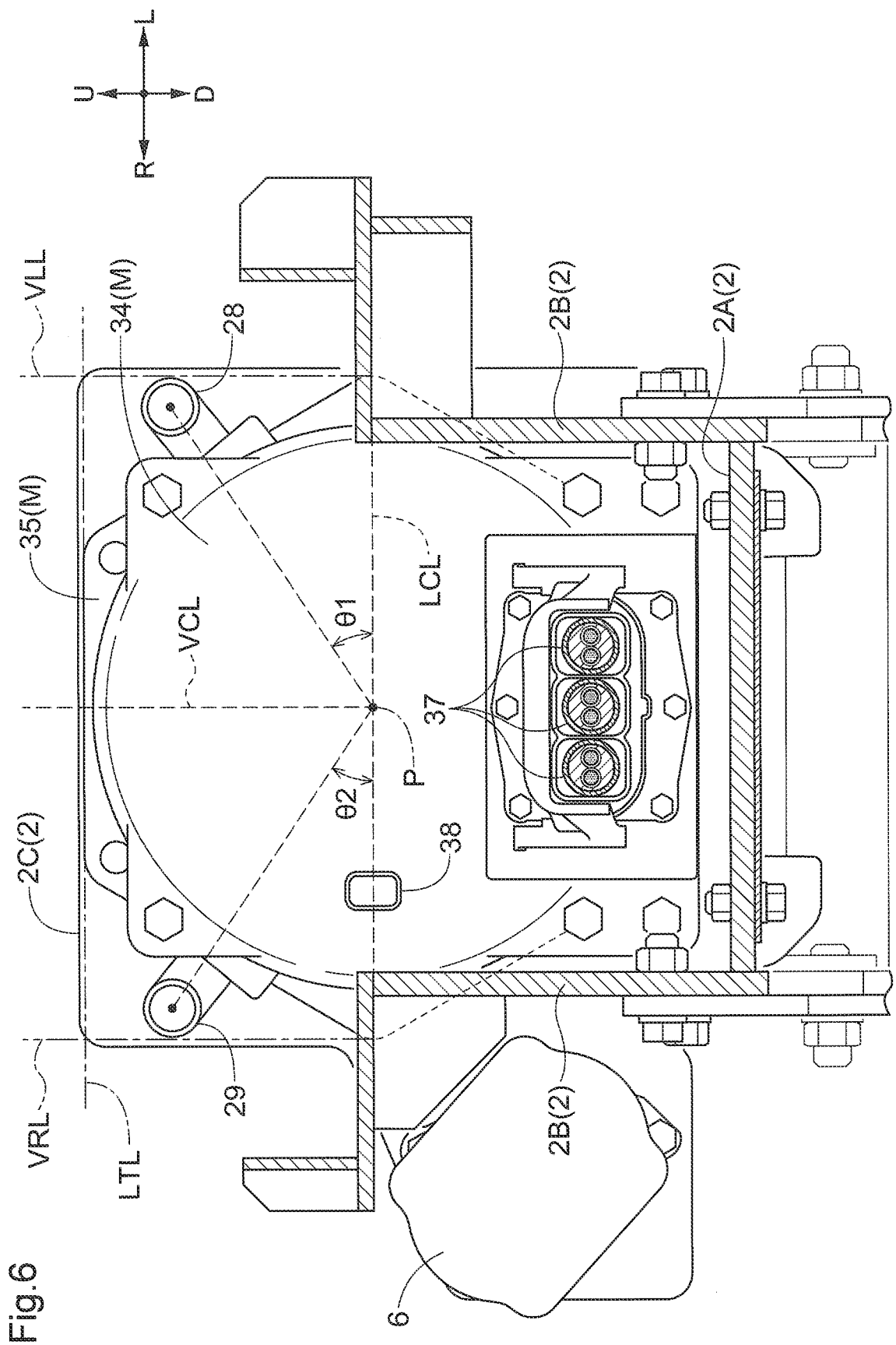
FIG. 6 is a front view showing an example arrangement of a main portion of a motor.
Figure 7:
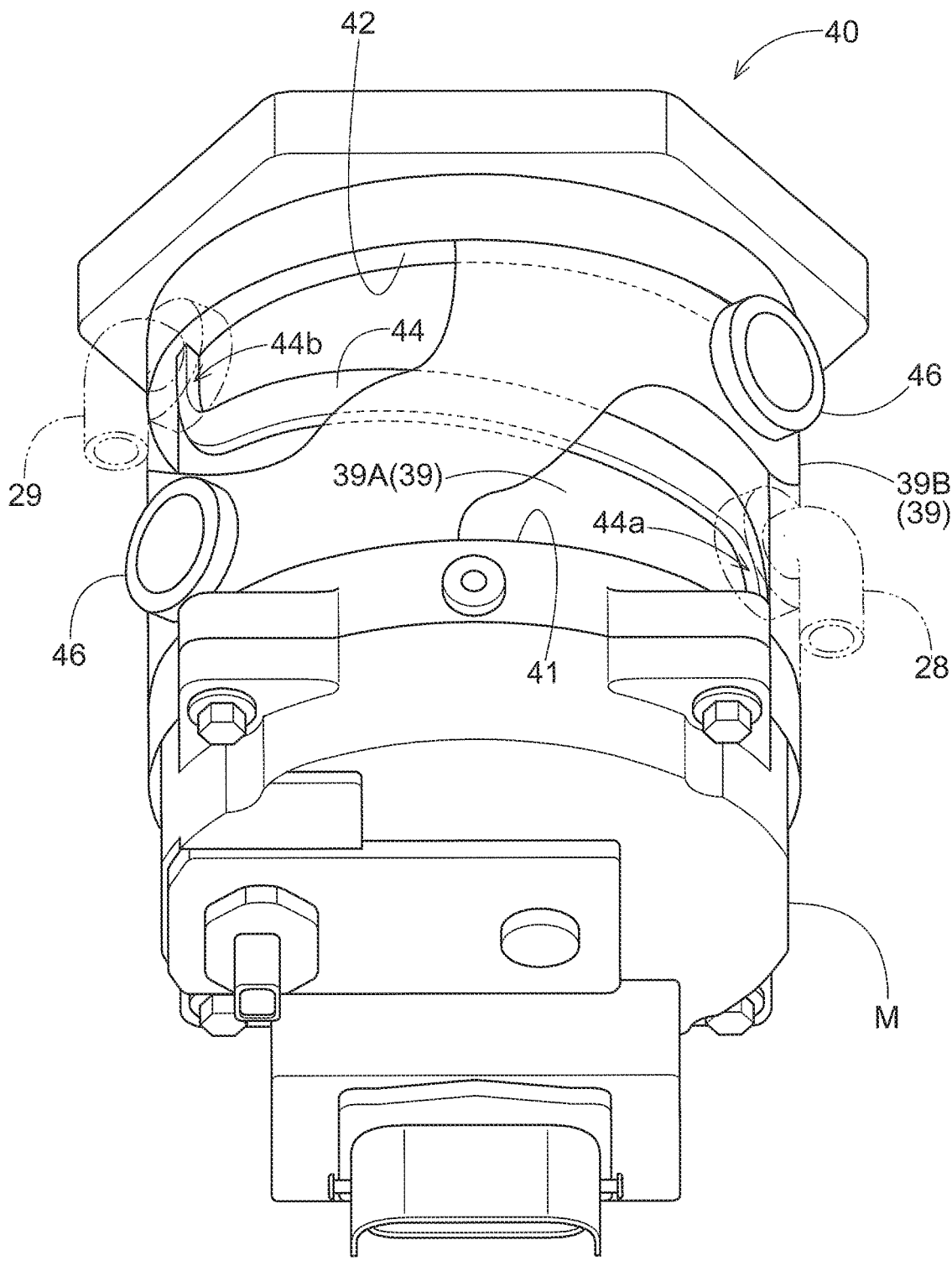
FIG. 7 is a perspective view showing an example schematic configuration of a motor coolant path.

Next, the following describes a structure to cool the motor M and the arrangement of the structure based on FIGS. 6 and 7 with reference to FIGS. 3 and 5.

As shown in FIG. 6, the body frame 2 includes a plate-shaped bottom plate 2A, a pair of left and right side plates 2B, and a vertical plate 2C. The pair of side plates 2B are plate-shaped structures and respectively arranged upright in two end portions of the bottom plate 2A in the left-right direction (width direction) of the body. The vertical plate 2C is a plate-shaped member and extends orthogonal to the bottom plate 2A and the pair of side plates 2B.

The motor M is disposed above the bottom plate 2A and supported in a cantilever manner by a surface of the vertical plate 2C facing the front side of the body. The motor M includes a body 34 and a plate-shaped attachment plate 35 provided at a rear portion of the body 34. The attachment plate 35 of the motor M is supported by the surface of the vertical plate 2C facing the front side of the body. The body 34 of the motor M is disposed between the pair of side plates 2B. Note that a hydraulic pump 6 is supported by the surface of the vertical plate 2C facing the front side of the body, next to the motor M in the left-right direction with one of the side plates 2B arranged between the hydraulic pump 6 and the motor M. The hydraulic pump 6 is driven by the motor M and supplies hydraulic fluid to a hydraulic device.

A front surface of the motor M includes three-phase power supply terminals 37 to which the three-phase alternating current (three-phase current) is input. Also, the front surface of the motor M includes a signal terminal 38 to input and output various signals.

As shown in FIGS. 6 and 7, the motor M includes a stator (not shown) and a rotor (not shown) inside the body 34. The stator is disposed along the inner side of a circumferential wall 39 of the body 34 to surround the rotor. The rotor of the motor M rotates about a rotation axis P when the three-phase alternating current is input to the stator. As a result of the rotor rotating, driving force is transmitted to the hydraulic continuously variable transmission 15.

As shown in FIG. 7, the motor M includes a spiral motor coolant path 40 extending along the circumferential wall 39 of the body 34. The circumferential wall 39 has a double wall structure and includes an inner circumferential wall 39A and an outer circumferential wall 39B (partially omitted in FIG. 7 to illustrate an internal structure), and the motor coolant path 40 is located between the inner circumferential wall 39A and the outer circumferential wall 39B.

A recess is formed in the circumferential wall 39 of the motor M, and the inner circumferential wall 39A corresponds to a bottom surface of the recess. The motor coolant path 40 is a region surrounded by a front end surface 41 of the recess, a rear end surface 42 of the recess, the inner circumferential wall 39A, and the outer circumferential wall 39B.

A partition wall 44 is provided in the motor coolant path 40. The partition wall 44 extends diagonally relative to the circumferential direction of the circumferential wall 39 from a position at which the partition wall 44 is in contact with the front end surface 41 to a position at which the partition wall 44 is in contact with the rear end surface 42. The partition wall 44 has a length that is about ¼ of the length (circumference) of the circumferential wall 39 in the circumferential direction of the circumferential wall 39, for example. The partition wall 44 extends along the inner circumferential wall 39A and the outer circumferential wall 39B and is in contact with the inner circumferential wall 39A and the outer circumferential wall 39B. Accordingly, the motor coolant path 40 has a spiral shape extending from a start end portion 44a of the partition wall 44, which is in contact with the front end surface 41, to a terminal end portion 44b of the partition wall 44, which is in contact with the rear end surface 42. The length of the motor coolant path 40 is equal or approximately equal to a sum of the length of the circumferential wall 39 in the circumferential direction and the length of the partition wall 44.

With this configuration, it is possible to efficiently increase the length of the motor coolant path 40 along the circumferential wall 39 of the motor M to efficiently cool the motor M.

The motor coolant path 40 includes the inlet portion 28 through which the coolant flowing through the cooling path 26 enters the motor coolant path 40, and the outlet portion 29 from which the coolant that has passed through the motor coolant path 40 is discharged to the cooling path 26.

The inlet portion 28 is provided in a region adjacent to the outlet portion 29 side of the start end portion 44a of the partition wall 44 and extends from the motor coolant path 40 through the outer circumferential wall 39B. The outlet portion 29 is provided in a region adjacent to the inlet portion 28 side of the terminal end portion 44b of the partition wall 44 and extends from the motor coolant path 40 through the outer circumferential wall 39B. Accordingly, the coolant enters from the inlet portion 28, flows through the spiral motor coolant path 40 along the circumferential wall 39, and is discharged from the outlet portion 29 to the cooling path 26.

As shown in FIG. 6, the inlet portion 28 and the outlet portion 29 are above a horizontal center line LCL in a front view. The horizontal center line LCL is a virtual line extending in the left-right direction (width direction) of the body and passing through the rotation axis P, which is the center of the motor M (body 34). It is preferable that the inlet portion 28 and the outlet portion 29 are provided above upper end portions of the side plates 2B. The inlet portion 28 and the outlet portion 29 are provided separately on opposite sides of a vertical center line VCL in the left-right direction (width direction). The vertical center line VCL is a virtual line extending in the up-down direction (height direction) of the body and passing through the rotation axis P, which is the center of the motor M (body 34). For example, the inlet portion 28 is provided in a left region of the motor M and the outlet portion 29 is provided in a right region of the motor M in the front view.

It is particularly preferable that an interior angle θ1 between the horizontal center line LCL and a line segment connecting the center of the opening of the inlet portion 28 and the rotation axis P is about 30° or more and about 55° or less, for example. It is also preferable that an interior angle θ2 between the horizontal center line LCL and a line segment connecting the center of the opening of the outlet portion 29 and the rotation axis P is about 30° or more and about 55° or less, for example.

When the inlet portion 28 and the outlet portion 29 are arranged as described above, the inlet portion 28 and the outlet portion 29 can efficiently connect the motor coolant path 40 and the cooling path 26 and can be efficiently arranged in the motor M.

Furthermore, it is preferable that the inlet portion 28 is located within a region surrounded by the horizontal center line LCL, the vertical center line VCL, and a vertical left end line VLL (first vertical line) in the front view. The vertical left end line VLL is a virtual line extending in the up-down direction (height direction) of the body and passing through a left end portion of the motor M. Likewise, it is preferable that the outlet portion 29 is located within a region surrounded by the horizontal center line LCL, the vertical center line VCL, and a vertical right end line VRL (second vertical line) in the front view. The vertical right end line VRL is a virtual line extending in the up-down direction (height direction) of the body and passing through a right end portion of the motor M.

In this case, the inlet portion 28 and the outlet portion 29 are located inward of respective edges of the motor M (the body 34 and the attachment plate 35) in the left-right direction and the up-down direction. Accordingly, the motor M including the inlet portion 28 and the outlet portion 29 is efficiently arranged in the body.

Also, the three-phase power supply terminals 37 are provided below the horizontal center line LCL in the front view. Likewise, the signal terminal 38 is provided near the horizontal center line LCL in the up-down direction.

Accordingly, the three-phase power supply terminals 37 and the signal terminal 38 are spaced apart from the inlet portion 28 and the outlet portion 29 in the up-down direction of the motor M. Therefore, even if the coolant leaks from the inlet portion 28 or the outlet portion 29, the coolant can be kept from coming into contact with the three-phase power supply terminals 37 and the signal terminal 38. Consequently, it is possible to reduce or prevent the occurrence of problems in the three-phase power supply terminals 37 and the signal terminal 38 caused by the coolant.

Furthermore, it is preferable that the three-phase power supply terminals 37 are disposed in the center region of the body in the left-right direction (width direction), and the signal terminal 38 is eccentric leftward or right from the vertical center line VCL, i.e., eccentric in the left-right direction (width direction) of the body relative to the three-phase power supply terminals 37. For example, the signal terminal 38 is provided in the vicinity of a right end portion of the body 34 of the motor M.

A three-phase alternating current having a high frequency is input at a high voltage to the three-phase power supply terminals 37, and the frequency and the voltage need to be stable in order to control the rotational speed of the motor M. Also, various control signals and detection signals are input to the signal terminal 38 or output from the signal terminal 38.

Therefore, the three-phase power supply terminals 37 are spaced apart from the signal terminal 38 in the up-down direction (height direction) and the left-right direction (width direction) of the body, and consequently, the three-phase power supply terminals 37 and the signal terminal 38 can be kept from being affected by noise from each other, and the motor M can be operated precisely.

A casing portion of the motor M that includes the motor coolant path 40 is produced through casting. The motor coolant path 40 is formed with use of a sand core. Therefore, discharge ports 46 (see FIG. 7) for discharging the sand constituting the core are provided in the motor coolant path 40 of the body 34. The plurality of discharge ports 46 are provided along the motor coolant path 40. The discharge ports 46 are eventually covered.

Next, the following describes a configuration including a structure to cool the inverter 14 based on FIGS. 8 to 11 with reference to FIGS. 3 and 5.

The inverter 14 converts a direct current supplied from the battery 4 to a three-phase alternating current (three-phase current, three-phase power) having a predetermined frequency, and supplies the three-phase alternating current to the motor M.

Figure 8:
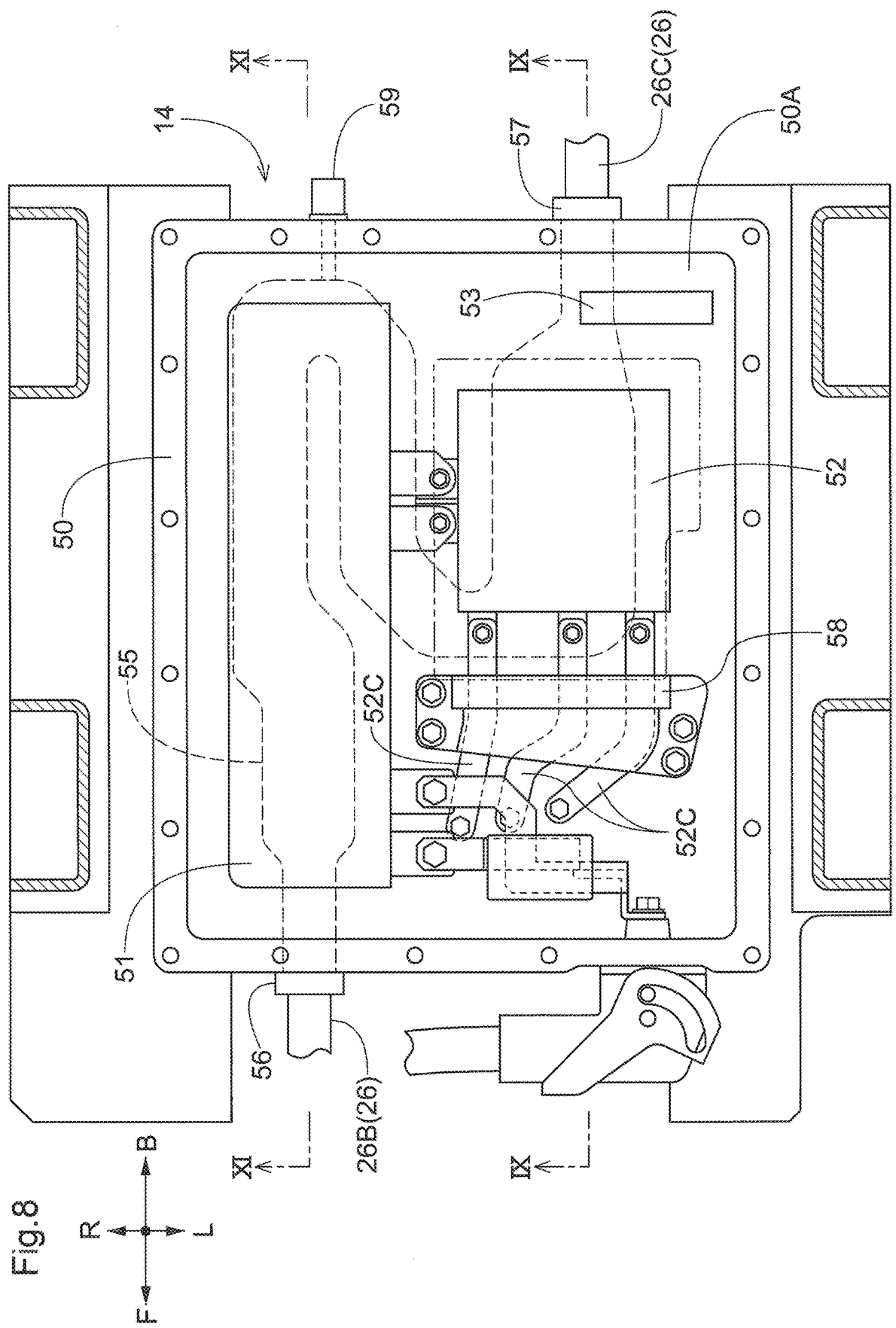
FIG. 8 is a plan view showing an example configuration of a main portion of the inverter.

As shown in FIG. 8, the inverter 14 includes an inverter case 50 and components such as a capacitor 51, an IGBT 52, which is an example of a power transistor, and a resistor 53 provided inside the inverter case 50.

The capacitor 51 smooths the direct current supplied from the battery 4. The IGBT 52 converts the direct current smoothed by the capacitor 51 to the three-phase alternating current having the predetermined frequency, and supplies the three-phase alternating current to the motor M. The resistor 53 is provided to consume and discharge power stored in the capacitor 51 after the inverter 14 is stopped.

The inverter case 50 includes outer plates including a mounting plate 50A, and a closed space surrounded by the outer plates is defined inside the inverter case 50. The capacitor 51, the IGBT 52, and the resistor 53 are supported by the mounting plate 50A in the closed space.

The capacitor 51, the IGBT 52, and the resistor 53 generate heat while operating, and may malfunction due to the heat. Therefore, the inverter 14 includes an inverter coolant path 55 to cool components such as the capacitor 51, the IGBT 52, and the resistor 53 as targets to be cooled.

The inverter coolant path 55 is provided inside the mounting plate 50A, and the coolant introduced from the cooling path 26 flows through the inverter coolant path 55. The inverter case 50 includes an inlet portion 56 and an outlet portion 57. The coolant flowing through the cooling path 26 (cooling path 26B) enters the inverter coolant path 55 via the inlet portion 56, and the coolant that has passed through the inverter coolant path 55 flows out to the cooling path 26 (cooling path 26C) from the outlet portion 57.

The inverter coolant path 55 is arranged inside the mounting plate 50A so as to extend along the components that are the targets to be cooled to cool the components of the inverter 14. In the example shown in FIG. 8, the capacitor 51, the IGBT 52, and the resistor 53 are held on an upper surface of the mounting plate 50A, and accordingly, the inverter coolant path 55 inside the mounting plate 50A is under the capacitor 51, the IGBT 52, and the resistor 53.

For example, the inverter coolant path 55 extends from the inlet portion 56 through regions respectively extending along the capacitor 51, the IGBT 52, and the resistor 53.

Generally, the capacitor 51 generates less heat than the IGBT 52, but the heat resistance of the capacitor 51 is lower than the heat resistance of the IGBT 52 and the resistor 53. Therefore, the capacitor 51 needs to be cooled preferentially among all components of the inverter 14.

The IGBT 52 generates the high-voltage alternating current (three-phase alternating current), and accordingly generates more heat than the capacitor 51 and the resistor 53, but can resist a higher temperature than the capacitor 51, and it is highly likely that the capacitor 51 will malfunction earlier than the IGBT 52. Also, the possibility of the malfunction of the resistor 53 is lower than the possibilities of the malfunction of the capacitor 51 and the IGBT 52, and accordingly, the need to cool the resistor 53 is lower than the need to cool the capacitor 51 and the IGBT 52.

As described above, the coolant cools the capacitor 51, the IGBT 52, and the resistor 53 in this order, and therefore, the capacitor 51 is cooled preferentially and efficiently. If the capacitor 51 is cooled later than the IGBT 52, it is difficult to sufficiently cool the capacitor 51 because the temperature of the coolant significantly increases when the coolant cools the IGBT 52. To the contrary, it is possible to sufficiently cool the IGBT 52 even with the coolant that has cooled the capacitor 51 and has an increased temperature, because the IGBT 52 generates a large amount of heat and therefore has a higher temperature than the coolant, and the IGBT 52 has higher heat resistance than the capacitor 51. Also, the need to cool the resistor 53 is lower than the need to cool the capacitor 51 and the IGBT 52.

For the reasons described above, the inverter coolant path 55 is structure such that the capacitor 51, the IGBT 52, and the resistor 53 are cooled in this order, and with this configuration, it is possible to efficiently cool the capacitor 51, the IGBT 52, and the resistor 53 in accordance with their characteristics.

For example, the inverter coolant path 55 extends along the capacitor 51 from the inlet portion 56 toward the rear of the body, makes a U-turn near a rear end portion of the capacitor 51, and then extends along the capacitor 51 toward the front of the body. The inverter coolant path 55 again makes a U-turn in front of the IGBT 52, and then extends along the IGBT 52 toward the rear of the body while increasing its width (width in the left-right direction of the body). Then, the inverter coolant path 55 passes through the resistor 53 toward the rear of the body while narrowing its width and reaches the outlet portion 57.

With this configuration, it is possible to efficiently cool the capacitor 51, the IGBT 52, and the resistor 53 with the coolant flowing through the inverter coolant path 55.

Figure 9:
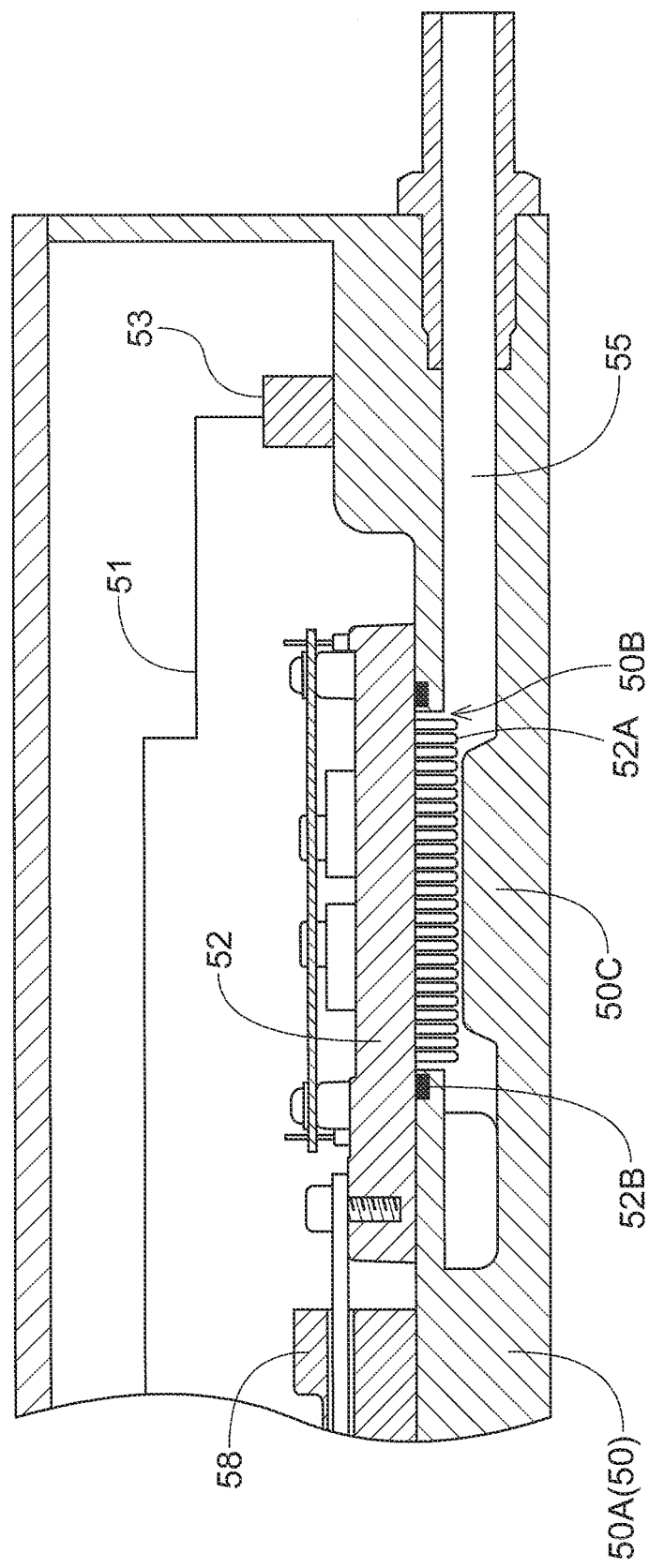
FIG. 9 is a left side view showing a main portion of a cross section taken along the line IX-IX in FIG. 8.

As shown in FIG. 9, the IGBT 52 includes a heat sink. The heat sink may include fins or the like, and may also be pin fins 52A arranged to define a matrix on a surface of the IGBT 52.

The mounting plate 50A includes a through hole 50B in a region where the IGBT 52 is disposed. The through hole 50B extends from the closed space inside the inverter case 50 to the inverter coolant path 55. The IGBT 52 is supported by the mounting plate 50A in such a manner that the pin fins 52A are located in the through hole 50B. The pin fins 52A extend through the through hole 50B and reach the inverter coolant path 55.

In this configuration, the pin fins 52A directly come into contact with the coolant flowing through the inverter coolant path 55, and therefore, it is possible to efficiently cool the IGBT 52 via the pin fins 52A.

It is preferable that the inner diameter of the inverter coolant path 55 is smaller at the position where the pin fins 52A protrude in the inverter coolant path 55. For example, a portion of the mounting plate 50A facing the pin fins 52A includes a protruding portion 50C protruding toward the inside of the inverter coolant path 55 at the position where the pin fins 52A protrude in the inverter coolant path 55.

Due to the inner diameter of the inverter coolant path 55 being smaller at the position where the pin fins 52A protrude in the inverter coolant path 55, the flow rate of the coolant increases when the coolant passes through the position, and the coolant can efficiently cool the IGBT 52 via the pin fins 52A. Also, the coolant precisely comes into contact with the pin fins 52A, and the IGBT 52 can be cooled precisely via the pin fins 52A.

Figure 10:
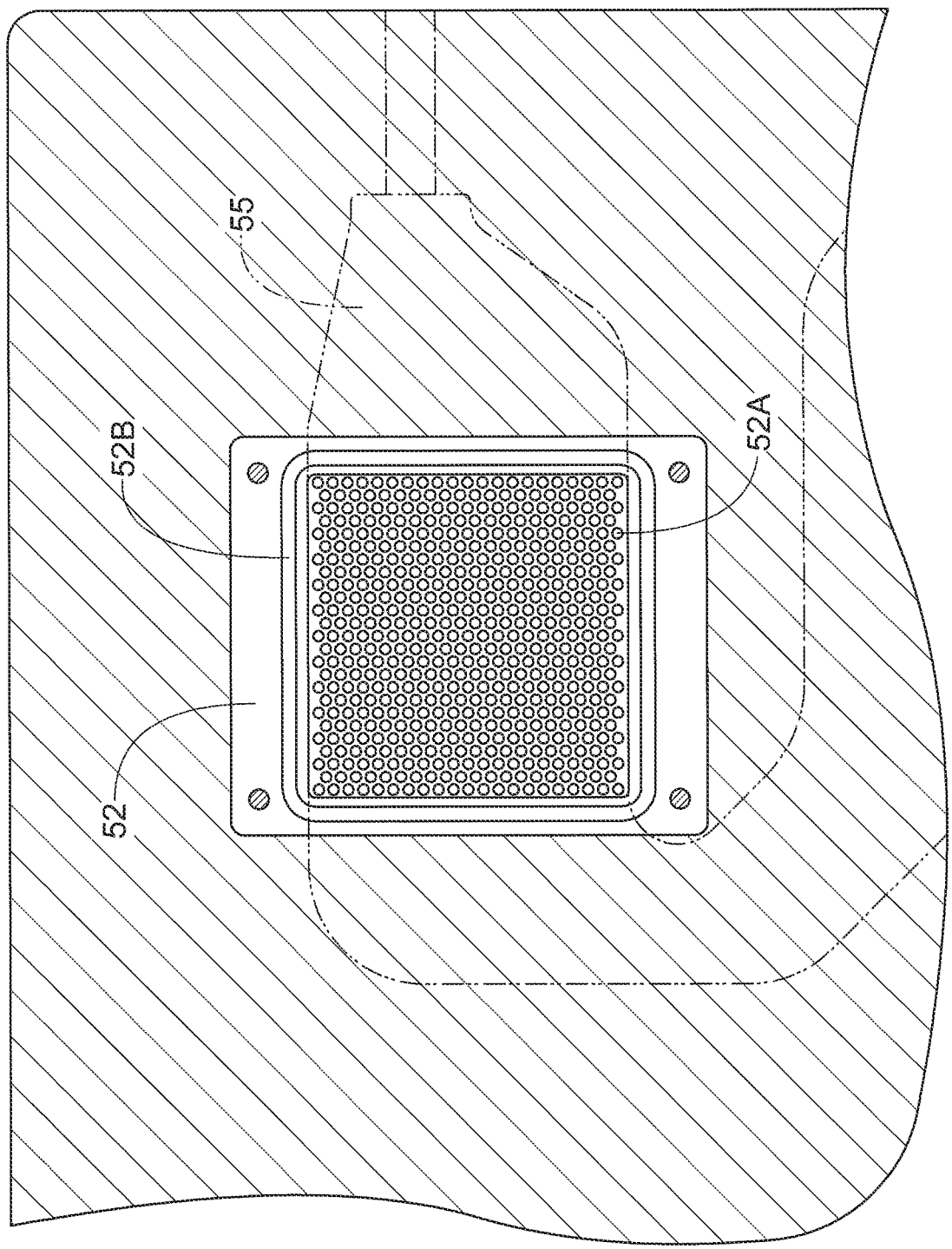
FIG. 10 is a bottom view showing an example configuration of an IGBT.

As shown in FIGS. 9 and 10, it is preferable that the inverter 14 includes an O-ring 52B located in or filling a gap between the IGBT 52 and the mounting plate 50A around the through hole 50B. For example, the O-ring 52B is disposed so as to come into close contact with an outer peripheral portion of the IGBT 52 and an inner peripheral portion of the through hole 50B.

With this configuration, it is possible to prevent the coolant flowing through the inverter coolant path 55 from entering the closed space inside the inverter 14 via the through hole 50B. Consequently, it is possible to reduce or prevent malfunction of the various components of the inverter 14 due to the coolant.

Figure 11:
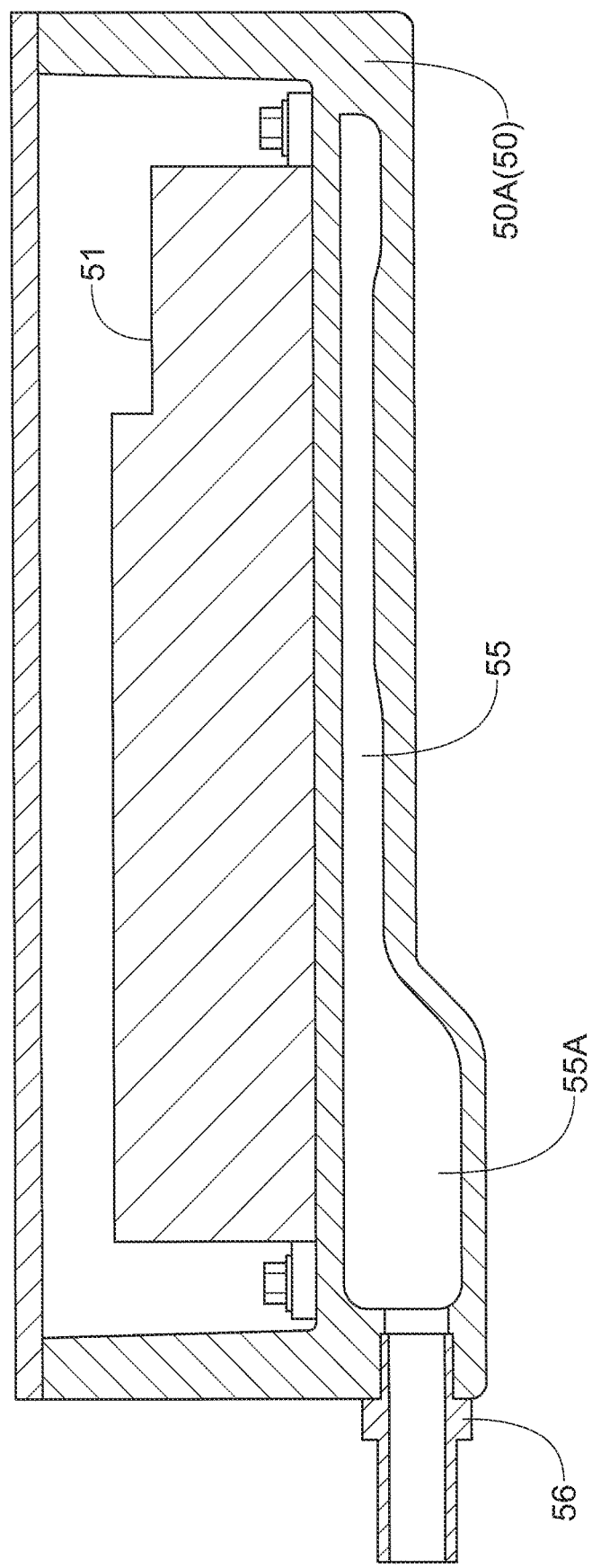
FIG. 11 is a left side view showing a main portion of a cross section taken along the line XI-XI in FIG. 8.

As shown in FIG. 11, the capacitor 51 is supported on the surface of the mounting plate 50A in the closed space. On a bottom surface of the capacitor 51, at least a region thereof extending along the inverter coolant path 55 is smooth and flat. At least a region of the mounting plate 50A on which the capacitor 51 is mounted is smooth and flat. Therefore, at least the region of the capacitor 51 extending along the inverter coolant path 55 comes into surface contact with the mounting plate 50A and is held in close contact therewith.

Since the capacitor 51 is in close surface contact with the mounting plate 50A, the coolant flowing through the inverter coolant path 55 can efficiently exchange heat with the capacitor 51 via the mounting plate 50A and efficiently cool the capacitor 51.

Also, a coolant storing section 55A is provided near the inlet portion 56 of the inverter coolant path 55. The coolant storing section 55A extends from the inlet portion 56 to the inlet portion 56 side end region of the portion of the inverter coolant path 55 extending along the capacitor 51, for example.

The coolant storing section 55A has a larger path diameter, which is the area of a cross section of the coolant path taken along the vertical direction, than the remaining portion of the inverter coolant path 55, and is capable of storing the coolant. With this configuration, it is possible to store the coolant in the inverter coolant path 55 and sufficiently supply the coolant to the inverter coolant path 55, and therefore, it is possible to efficiently cool the components of the inverter 14 that are the targets to be cooled.

As shown in FIG. 8, the inverter 14 includes a water temperature sensor 59 (temperature sensor) to measure the temperature of the coolant, e.g., the temperature of cooling water, flowing through the inverter coolant path 55. The water temperature sensor 59 is provided between the region to cool the capacitor 51 and the region to cool the IGBT 52 in the inverter coolant path 55, for example. More specifically, the water temperature sensor 59 is provided on the portion of the inverter coolant path 55 making a U-turn in the region to cool the capacitor 51, for example.

The need to cool the capacitor 51 is high, and if the temperature of the coolant that has cooled the capacitor 51 or is cooling the capacitor 51 is higher than or equal to a predetermined temperature, it can be determined that the capacitor 51 is not sufficiently cooled. Also, if the temperature of the coolant cooling the IGBT 52 is higher than or equal to another predetermined temperature, it can be determined that the IGBT 52 cannot be cooled sufficiently. Also, it is possible to check the state of operation of the inverter 14 based on the measured water temperature (temperature of the coolant).

Therefore, the temperature of the cooling water (coolant) is measured by the water temperature sensor 59, and the flow rate of the coolant flowing through the inverter coolant path 55 or the operation of the inverter 14 can be controlled in accordance with the water temperature. For example, if the water temperature (temperature of the coolant) measured by the water temperature sensor 59 is higher than or equal to the predetermined temperature, it is possible to control the electric pump 24 to increase the flow rate of the coolant or stop the inverter 14. Also, if the water temperature (temperature of the coolant) measured by the water temperature sensor 59 is about the room temperature, it is possible to determine that the inverter 14 is not operating and perform control so as to stop at least the flow of the coolant through the inverter 14 (inverter coolant path 55). With this configuration, it is possible to cool the inverter 14 efficiently and precisely.

Also, the inverter 14 includes a current sensor 58 to measure the current value of the three-phase alternating current generated by the IGBT 52. The current sensor 58 is supported by three-phase AC wires 52C in front of the IGBT 52. The IGBT 52 generates the predetermined three-phase alternating current while referring to the current value measured by the current sensor 58.

The current sensor 58 may be disposed in such a manner as to have a region overlapping the inverter coolant path 55 in a plan view, but may also be spaced apart from the inverter coolant path 55. The current sensor 58 generates less heat than the IGBT 52 and has lower heat resistance than the capacitor 51. Therefore, the current sensor 58 does not necessarily need to be disposed along the inverter coolant path 55 and is sufficiently cooled through heat transfer with the coolant via the inverter case 50.

OTHER EXAMPLE EMBODIMENTS (1) The heat resistance of the inverter 14 is not necessarily low. Likewise, the motor M does not necessarily generate a large amount of heat. Therefore, there is no limitation to the configuration in the above example embodiments in which the cooling path 26 is structured such that the coolant flows through the inverter 14, the motor M, and the DC/DC converter 21 in this order. The coolant may also be caused to flow through the inverter 14, the motor M, and the DC/DC converter 21 in a suitable order in accordance with the heat generation amount and the heat resistance of these devices.

In this manner, it is possible to efficiently configure the cooling mechanism in accordance with the characteristics of the targets to be cooled.

(2) In each of the above example embodiments, the cooling mechanism (cooling path 26) may also be configured to cool at least one of the inverter 14, the motor M, and the DC/DC converter 21. For example, a configuration is also possible in which the cooling path 26 does not pass through the DC/DC converter 21. In this case, the coolant that has flowed out from the motor M is directly returned to the radiator 23 through the cooling path 26 without passing through the DC/DC converter 21.

To the contrary, the cooling mechanism (cooling path 26) may also be configured to cool another target to be cooled in addition to at least one of the inverter 14, the motor M, and the DC/DC converter 21.

As described above, it is possible to increase the freedom in the configuration of the cooling mechanism (cooling path 26) and cool various targets to be cooled with the cooling mechanism. For example, a battery and a charger may also be disposed midway on the cooling path 26 and cooled by the cooling mechanism.

(3) In each of the above example embodiments, there is no limitation to the above-described arrangement of the radiator 23, the cooling path 26, the electric pump 24, the inverter 14, the motor M, and the DC/DC converter 21, and suitable arrangement may be adopted. By improving or optimizing the arrangement in accordance with the characteristics and operation conditions of the targets to be cooled, it is possible to efficiently cool the targets.

(4) In each of the above example embodiments, the motor coolant path 40 may also be a spiral path that winds around the circumferential wall 39 a suitable number of times. The length of the motor coolant path 40, which is proportional to the number of turns of the spiral, is determined by the number of times the partition wall 44 winds around the circumferential wall 39.

In this case, it is possible to easily form the motor coolant path 40 having an appropriate length in accordance with the characteristics of the motor M and efficiently cool the motor M.

(5) In each of the above example embodiments, the three-phase power supply terminals 37 and the signal terminal 38 may be arranged at suitable positions. This makes it possible to increase the freedom in optimizing the structure of the motor M.

(6) In each of the above example embodiments, a component other than the capacitor 51, the IGBT 52, the resistor 53, and the current sensor 58 may also be mounted as a target in the inverter 14. To the contrary, a configuration is also possible in which the capacitor 51, the IGBT 52, the resistor 53, or the current sensor 58 is not mounted in the inverter 14.

In this case, the components that need to be cooled can be cooled by efficiently cooling an area of the inverter 14 that needs to be cooled in accordance with the configuration of the inverter 14.

(7) In each of the above example embodiments, the electric work vehicle may include a suitable travel device such as a crawler instead of the front wheels 10 and the rear wheels 11.

(8) In each of the above example embodiments, the present invention is applicable to not only electric tractors but also electric agricultural work vehicles such as electric combines or electric rice planters and electric work vehicles that perform various tasks.

Example embodiments of the present invention are applicable to electric work vehicles that each performs various tasks such as agricultural tasks.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electric work vehicle comprising:
    a body;
    a travel device in the body;
    a motor to drive the travel device;
    an inverter to supply power to the motor;
    an electric component;
    a DC/DC converter to convert a voltage of power to be supplied to the electric component;
    a radiator to cool a coolant; and
    a cooling path through which the coolant cooled by the radiator circulates through the motor, the inverter, and the DC/DC converter and returns to the radiator; wherein
    the cooling path extends from the radiator, passes through the inverter, the motor, and the DC/DC converter in this order, and returns to the radiator;
    a portion of the cooling path extending from the motor to the DC/DC converter does not overlap the inverter in a plan view; and
    the portion of the cooling path extending from the motor to the DC/DC converter does not overlap the inverter in a side view.

2. The electric work vehicle according to claim 1, wherein the radiator, the inverter, and the motor are arranged in this order in a front-rear direction of the body from a front side corresponding to a forward travel direction of the body.

3. The electric work vehicle according to claim 1, wherein the DC/DC converter is beside the radiator on one side in a left-right direction orthogonal to a front-rear direction.

4. The electric work vehicle according to claim 3, wherein
    the cooling path includes a portion extending from the inverter to the motor and connected to the motor on another side of the motor opposite to the one side in the left-right direction; and
    the portion of the cooling path extending from the motor to the DC/DC converter is connected to the motor on the one side of the motor in the left-right direction.

5. The electric work vehicle according to claim 2, further comprising:
    a battery to store power to be supplied to the motor via the inverter; wherein
    the inverter is under the battery and overlaps the battery in the plan view.

6. An electric work vehicle comprising:
    a body;
    a travel device in the body;
    a motor to drive the travel device;
    a radiator to cool a coolant; and
    a cooling path through which the coolant cooled by the radiator passes at least through the motor and returns to the radiator; wherein
    the motor includes:
        a motor coolant path through which the coolant circulates in a surface region of the motor;
        an inlet portion connected to the motor coolant path and through which the coolant flowing through the cooling path enters the motor coolant path; and an outlet portion connected to the motor coolant path and through which the coolant that flowed through the motor coolant path is discharged to the cooling path; wherein in a front view, the inlet portion and the outlet portion are above a horizontal center line passing through a center of the motor in an up-down direction, and are separately provided on opposite sides of a vertical center line passing through a center of the motor in a width direction; and the motor coolant path spirally extends along an entire circumference of a circumferential wall of the motor, and the coolant that enters from the inlet portion flows in the width direction toward the outlet portion and, after flowing around the circumferential wall once, flows toward the outlet portion.

7. The electric work vehicle according to claim 6, wherein, in the front view, the horizontal center line defines a first interior angle with a line segment connecting a rotation axis of the motor and the inlet portion, the horizontal center line defines a second interior angle with a line segment connecting the rotation axis and the outlet portion, and the first interior angle and the second interior angle are each about 30° or more and about 55° or less.

8. The electric work vehicle according to claim 6, wherein the inlet portion and the outlet portion are located within a region between the horizontal center line and a straight line that is in contact with an upper end portion of the motor and between a first vertical line and a second vertical line, the first vertical line being in contact with one end portion of the motor in the width direction, and the second vertical line being in contact with another end portion of the motor in the width direction.

9. The electric work vehicle according to claim 6, wherein the motor further includes:
   a three-phase power supply terminal to receive input of a three-phase current; and
   a signal terminal;
   the three-phase power supply terminal is below the horizontal center line in the front view;
   the signal terminal is in a vicinity of the horizontal center line in the front view; and
   the three-phase power supply terminal and the signal terminal have respective centers deviated from each other in the width direction.

10. The electric work vehicle according to claim 6, further comprising:
   a body frame including a bottom plate, a vertical plate, and a pair of side plates; wherein
   the motor is supported by the vertical plate in a cantilever manner and located above the bottom plate and between the pair of side plates.

11. The electric work vehicle according to claim 10, further comprising:
   a hydraulic pump to supply hydraulic fluid; wherein
   the hydraulic pump is positioned laterally outward of the motor and held by the vertical plate.

12. An electric work vehicle comprising:
   a body;
   a travel device in the body;
   a motor to drive the travel device;
   an inverter to supply power to the motor;
   a radiator to cool a coolant; and
   a cooling path through which the coolant cooled by the radiator passes at least through the inverter and returns to the radiator; wherein
   the inverter includes:
      an inverter case including a mounting plate and defining a closed space;
      a capacitor on the mounting plate in the closed space to smooth a direct current input to the capacitor;
      a power transistor on the mounting plate in the closed space to convert the direct current supplied from the capacitor to a three-phase alternating current having a predetermined frequency;
      a resistor on the mounting plate in the closed space to discharge power stored in the inverter; and
      an inverter coolant path provided inside the mounting plate and through which the coolant circulates through the inverter to cool the capacitor, the power transistor, and the resistor;
   the coolant cools the capacitor, the power transistor, and the resistor in this order;
   the power transistor includes a heat sink;
   the inverter coolant path includes a through hole penetrating toward the closed space; and
   the heat sink extends through the through hole and protrudes into the inverter coolant path.

13. The electric work vehicle according to claim 12, wherein the inverter includes an O-ring in a gap between an outer peripheral portion of the power transistor and an inner peripheral portion of the through hole.

14. The electric work vehicle according to claim 12, wherein the inverter coolant path includes a protruding portion in which the mounting plate protrudes toward the power transistor in a region of the inverter coolant path that overlaps the power transistor.

15. The electric work vehicle according to claim 12, wherein the inverter coolant path includes a coolant storing section in a region where the coolant enters the inverter coolant path, and the coolant storing section has a larger cross-sectional area than a remaining portion of the inverter coolant path other than the coolant storing section.

16. The electric work vehicle according to claim 12, further comprising:
   a temperature sensor to measure a temperature of the coolant between a position at which the coolant cools the capacitor and a position at which the coolant cools the power transistor in the inverter coolant path.

\* \* \* \* \*